United States Patent
Culver et al.

(10) Patent No.: US 10,162,797 B1
(45) Date of Patent: Dec. 25, 2018

(54) SYSTEM FOR DETERMINING STRUCTURAL MEMBER LIFTABILITY

(71) Applicant: Design Data Corporation, Lincoln, NE (US)

(72) Inventors: Matthew G. Culver, Lincoln, NE (US);
James P. Schwartz, Lincoln, NE (US);
Michael T. Obst, Lincoln, NE (US)

(73) Assignee: DESIGN DATA CORPORATION, Lincoln, NE (US)

( * ) Notice: Subject to any disclaimer, the term of this patent is extended or adjusted under 35 U.S.C. 154(b) by 886 days.

(21) Appl. No.: 13/861,497

(22) Filed: Apr. 12, 2013

Related U.S. Application Data

(60) Provisional application No. 61/624,212, filed on Apr. 13, 2012.

(51) Int. Cl.
| | | |
|---|---|---|
| *G06F 17/00* | (2006.01) | |
| *B66C 23/26* | (2006.01) | |
| *G09B 9/02* | (2006.01) | |
| *B66C 17/00* | (2006.01) | |
| *G06F 11/30* | (2006.01) | |

(Continued)

(52) U.S. Cl.
CPC ............... *G06F 17/00* (2013.01); *B60P 1/14* (2013.01); *B66C 13/16* (2013.01); *B66C 17/00* (2013.01); *B66C 23/26* (2013.01); *B66C 23/36* (2013.01); *B66C 23/50* (2013.01); *B66C 23/68* (2013.01); *B66C 23/70* (2013.01); *B66C 23/74* (2013.01); *B66C 23/82* (2013.01); *B66C 23/905* (2013.01);

(Continued)

(58) Field of Classification Search
CPC ......... B66C 13/46; B66C 15/04; B66C 15/06; B66C 13/48; B66C 13/18; B66C 23/90; B66C 23/36; B66C 23/00; B66C 13/16; B66C 23/82; B66C 17/00; B66C 23/50; G06F 17/00; G09B 9/02; G09B 9/165; B60C 7/00; B60C 13/001; B66F 11/048; B66D 1/28; F16B 7/105; E01C 9/02; G06Q 10/0637; G06Q 30/016; G08G 1/01; F16M 11/105; F16M 11/18; F16M 11/2064; F16M 11/2021; F16M 11/42; F16M 11/28; G03B 17/561
USPC ............................................ 340/685; 701/50
See application file for complete search history.

(56) References Cited

U.S. PATENT DOCUMENTS

| | | |
|---|---|---|
| 4,228,681 A | 10/1980 | Pruex |
| 4,532,595 A | 7/1985 | Wilhelm |

(Continued)

*Primary Examiner* — Behrang Badii
(74) *Attorney, Agent, or Firm* — Milligan PC LLO

(57) ABSTRACT

A computing device is described that is configured to display a graphic visualization representing a physical work site for conveying whether a member is accessible as a function of parameters. In an implementation, the computing device includes a display device, a memory, and a processor communicatively coupled to the memory and the display device. The computing device includes a module stored in memory and executable by the processor. The module is configured to instruct the processor to receive parameters. The module is configured to cause the processor to determine liftability of at least one member. The module is configured to cause display of a graphic visualization representing a physical work site at the display device. The graphic visualization includes a graphical representation of the member. The graphical representation is displayed in a first hue when the crane can lift the member.

1 Claim, 4 Drawing Sheets

(51) Int. Cl.
  *B66C 23/36* (2006.01)
  *B66C 23/68* (2006.01)
  *B66C 23/82* (2006.01)
  *B66C 23/70* (2006.01)
  *B66C 13/16* (2006.01)
  *G09B 9/16* (2006.01)
  *B66C 23/50* (2006.01)
  *B66C 23/74* (2006.01)
  *B60P 1/14* (2006.01)
  *B66C 23/90* (2006.01)

(52) U.S. Cl.
  CPC ............. *G06F 11/30* (2013.01); *G09B 9/02* (2013.01); *G09B 9/165* (2013.01)

(56) References Cited

U.S. PATENT DOCUMENTS

| | | | |
|---|---|---|---|
| 4,995,518 A * | 2/1991 | McGhie | B66C 23/74 212/178 |
| 5,548,397 A * | 8/1996 | Kool | G01C 15/002 172/4.5 |
| 5,731,974 A * | 3/1998 | Pietzsch | B66C 13/18 346/146 |
| 5,921,415 A * | 7/1999 | Markelz | B66C 23/50 212/294 |
| 6,414,677 B1 * | 7/2002 | Robertson | G06F 3/04815 345/419 |
| 6,577,921 B1 * | 6/2003 | Carson | G06Q 10/08 340/850 |
| 6,587,795 B2 | 7/2003 | Schmid | |
| 6,965,823 B2 * | 11/2005 | Wichner | B66C 13/063 212/276 |
| 8,014,982 B2 | 9/2011 | Kang | |
| 8,275,591 B2 | 9/2012 | Hubler | |
| 2003/0224333 A1 * | 12/2003 | Vastvedt | G09B 9/02 434/29 |
| 2005/0098520 A1 * | 5/2005 | Frankenberger | B66C 23/905 212/276 |
| 2006/0044307 A1 * | 3/2006 | Song | G06Q 10/06 345/419 |
| 2006/0114171 A1 * | 6/2006 | Vascotto | G09B 9/00 345/1.1 |
| 2008/0131248 A1 * | 6/2008 | Friz | B66C 13/04 414/561 |
| 2008/0173605 A1 * | 7/2008 | Willim | B66C 23/68 212/177 |
| 2009/0162814 A1 * | 6/2009 | Swan | G09B 9/04 434/69 |
| 2009/0182537 A1 * | 7/2009 | Kang | G09B 9/05 703/2 |
| 2009/0276126 A1 * | 11/2009 | Morath | B66C 23/905 701/50 |
| 2010/0072158 A1 * | 3/2010 | Wanek | B66C 23/36 212/294 |
| 2013/0013144 A1 * | 1/2013 | Tanizumi | B66C 23/905 701/34.4 |

* cited by examiner

US 10,162,797 B1

SYSTEM FOR DETERMINING STRUCTURAL MEMBER LIFTABILITY

CROSS-REFERENCE TO RELATED APPLICATIONS

The present application claims the benefit under 35 U.S.C. § 119(e) of U.S. Provisional Application Ser. No. 61/624,212, entitled SYSTEM FOR DETERMINING STEEL MEMBER LIFTABILITY, filed on Apr. 13, 2012. U.S. Provisional Application Ser. No. 61/624,212 is herein incorporated by reference in its entirety.

BACKGROUND

A crane is a type of machine utilized to lift and lower materials, such as building (e.g., steel) members, as well as move the materials horizontally. For example, cranes may be utilized at construction sites for transitioning heavy materials from a first position to a second position.

SUMMARY

A computing device is described that is configured to display a graphic visualization representing a physical work site for conveying whether a member (e.g., steel member) is accessible as a function of position parameters and crane parameters. In an implementation, the computing device includes a display device, a memory, and a processor communicatively coupled to the memory and the display device. The computing device also includes a work site visualization module stored in memory and executable by the processor. The work site visualization module is configured to instruct the processor to receive a position parameter and a crane parameter. The work site visualization module is configured to cause the processor to determine the liftability (e.g., whether the steel member is accessible or inaccessible) of at least one member based upon at least the position parameter and the crane parameter. The module is then configured to cause display of a graphic visualization representing a physical work site (e.g., a construction site) at the display device. The graphic visualization includes a graphical representation of the at least one member. The graphical representation is displayed in a first hue when the member is determined to be accessible and in a second hue when the member is determined to be inaccessible.

This Summary is provided solely to introduce subject matter that is fully described in the Detailed Description and Drawings. Accordingly, the Summary should not be considered to describe essential features nor be used to determine scope of the claims.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
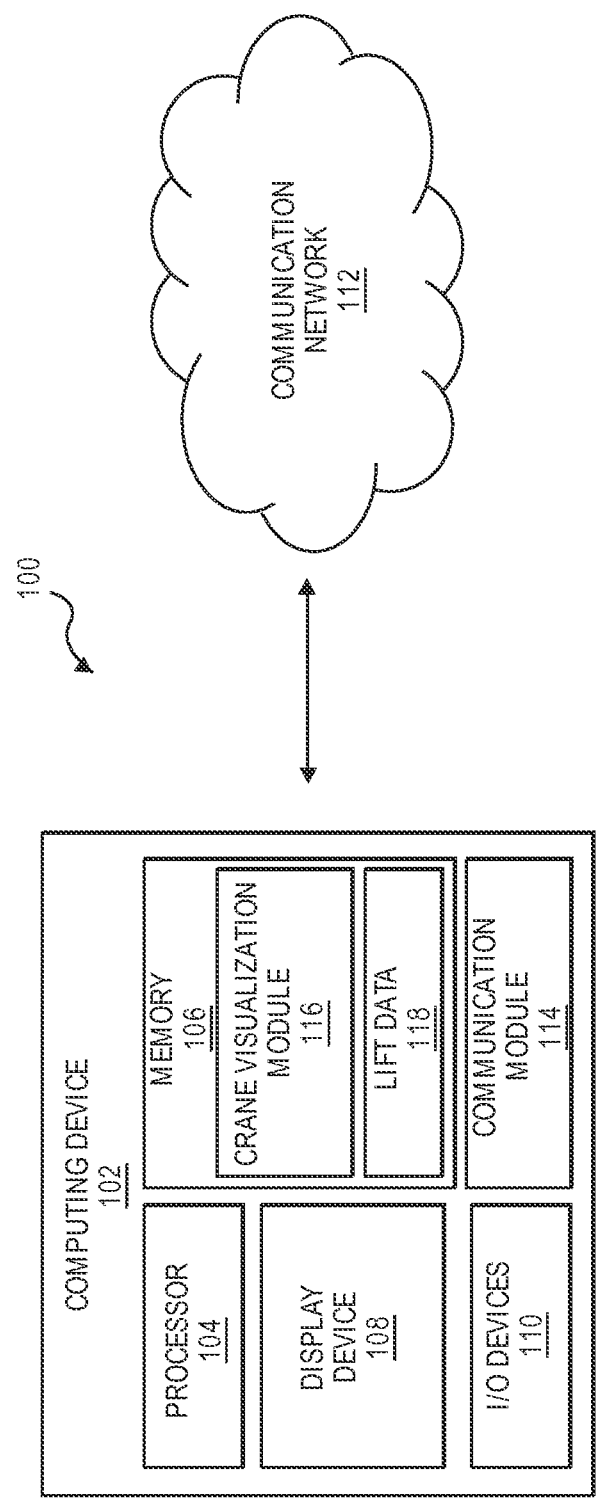
FIG. 1 is a block diagram of a system in accordance with example implementations of the present disclosure.

FIG. 1 illustrates a system 100 for furnishing one or more graphical visualizations of accessible and inaccessible members (e.g., building members, such as steel members) based upon a prospective placement of a crane. As shown, the system 100 includes a computing device 102 configured to furnish the one or more visualizations to a user. In one or more implementations, the computing device 102 may be a server computing device, a desktop computing device, a laptop computing device, or the like. As shown in FIG. 1, the computing device 102 includes a processor 104 and a memory 106.

The processor 104 provides processing functionality for the computing device 102 and may include any number of processors, micro-controllers, or other processing systems and resident or external memory for storing data and other information accessed or generated by the computing device 102. The processor 104 may execute one or more software programs (e.g., modules) that implement techniques described herein.

The memory 106 is an example of tangible computer-readable media that provides storage functionality to store various data associated with the operation of the computing device 102, such as the software program and code segments mentioned above, or other data to instruct the processor 104 and other elements of the computing device 102 to perform the steps described herein.

The computing device 102 is also communicatively coupled to a display 108 to display information to a user of the computing device 102. In embodiments, the display 108 may comprise an LCD (Liquid Crystal Diode) display, a TFT (Thin Film Transistor) LCD display, an LEP (Light Emitting Polymer) or PLED (Polymer Light Emitting Diode) display, and so forth, configured to display text and/or graphical information such as a graphical user interface. For example, the display 108 displays visual output to the user. The visual output may include graphics, text, icons, video, interactive fields configured to receive input from a user, and any combination thereof (collectively termed "graphics").

As shown in FIG. 1, the computing device 102 is also communicatively coupled to one or more input/output (I/O) devices 110 (e.g., a keyboard, buttons, a wireless input device, a thumbwheel input device, a trackstick input device, a touchscreen, and so on). The I/O devices 110 may also include one or more audio I/O devices, such as a microphone, speakers, and so on.

The computing device 102 is configured to communicate with one or more other computing devices over a communication network 112 through a communication module 114. The communication module 114 may be representative of a variety of communication components and functionality, including, but not limited to: one or more antennas; a browser; a transmitter and/or receiver (e.g., radio frequency circuitry); a wireless radio; data ports; software interfaces and drivers; networking interfaces; data processing components; and so forth.

The communication network 112 may comprise a variety of different types of networks and connections that are contemplated, including, but not limited to: the Internet; an intranet; a satellite network; a cellular network; a mobile data network; wired and/or wireless connections; and so forth.

Wireless networks may comprise any of a plurality of communications standards, protocols and technologies, including, but not limited to: Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11 g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS), and/or Short Message Service (SMS)), or any other suitable communication protocol.

The computing device 102 includes a crane visualization module 116, which is storable in memory 106 and executable by the processor 104. The crane visualization module 116 is representative of functionality to furnish one or more graphical visualizations representing the liftability of members (e.g., whether members are accessible or inaccessible based upon a position of the crane). The members may be steel members, such as columns, beams, trusses, and so forth utilized to construct an erected structure, such as a building, as a function of user-selected coordinates representing a position of a crane. In an implementation, the module 116 is configured to cause the processor 104 to initiate display of one or more graphical visualizations at the display 108 based upon one or more parameters provided by the user. It is contemplated that the user may be an engineer knowledgeable in the positioning of cranes for assisting in the construction of an erected structure.

As described above, the user of the computing device 102 can furnish one or more parameters to the computing device 102 to be utilized by the module 116. For example, the user may provide the parameters by way of one or more I/O devices 110 (e.g., keyboard, mouse, etc.). In an implementation, the user may furnish position parameters and crane parameters. The position parameters may represent a potential crane position that corresponds to a potential physical position (e.g., location) of the crane within a physical work site (e.g., a physical construction site). The position parameters may also include positions corresponding to physical locations of one or more steel members (e.g., physical location of the members with respect to the potential physical crane location) and, in some instances, positions corresponding to physical locations of various members that comprise an at least partially erected structure (e.g., physical location of the at least partially erected structure with respect to the potential physical crane location). For example, the position parameters may include, but are not limited to: one or more coordinates representing a position of the crane, one or more coordinates representing an initial position of the members, one or more coordinates representing a desired destination of the one or more members, one or more coordinates representing an at least partially erected structure (e.g., coordinates representing each member that comprises the at least partially erected structure), and so forth. The crane parameters may represent characteristics of the crane that include, but are not limited to: crane type (e.g., tower crane, self-erecting crane, truck-mounted crane, jib crane, telescopic crane, etc.), a crane model, a crane manufacturer, boom length of the crane, crane weight lifting capabilities, weight of hook block/ball, weight of slings and rigging, a counterweight of the crane, a capacity limit, and so forth. The crane parameters may at least partially include parameters defined and set forth by the crane manufacturers. These parameters may be pre-programmed and stored in memory 106. In one or more implementations, the module 116 is configured to cause the processor 104 to initiate display of one or more graphics representing one or more input fields (e.g., text input fields, drop down menus, etc.) to the display 108. The user can then input the required fields to define the position parameters and the crane parameters.

As shown in FIG. 1, the memory 106 also includes lift data 118. The lift data 118 may be dictated by one or more crane manufacturers. The lift data 118 may comprise one or more lift equations, lift tables, or the like, that may be utilized to determine whether a prospective crane can lift a member from a first position (e.g., an original position of a member) and deliver the member to a second position (e.g., destination) based upon the supplied position parameters and supplied crane parameters. For example, utilizing the crane and position parameters, as well as the defined parameters (characteristics) of the members (e.g., weight, length, width, type of steel member, etc.) to be lifted, the lift data 118 may define a range of acceptable values for which a specified crane may lift one or more members from a first position to a second position. Thus, the lift data 118 may include tables and/or equations that dictate whether the crane can safely lift a member from a first (initial) position to a second (final) position (e.g., lower risk of crane malfunctioning, lower risk of injury occurring, etc.) In an implementation, a first set of lift data 118 may correspond to a first crane type (e.g., lift data for a specific type of a tower crane), and a second set of lift data 118 may correspond to a second crane type (e.g., lift data for a specific type of truck crane). Thus, depending on the type of crane utilized, the corresponding lift data 118 that matches with the selected crane, the characteristics of the member to be moved, characteristics of the structure to be erected, one or more steel members may be determined to be accessible/inaccessible based upon the position of the crane, the type of crane utilized, and the characteristics of the steel members.

In an implementation, the module 116 may be also configured to receive pre-defined parameters (e.g., position parameters, crane parameters, structure parameters, member parameters, etc.) from one or more additional sources. The sources may include, but are not limited to: another computing device (e.g., a server), a file repository (e.g., zip files, etc.), and so forth. For example, the computing device 102 may be configured to import one or more pre-defined parameters from a file loaded on the computing device 102 (e.g., file is stored in memory 106). Additionally, the pre-defined parameters may include parameters representing the type of structure to be erected, parameters (characteristics) of each member to be utilized for erecting the structure, dimensions of the structure, and so forth.

Figure 2A:
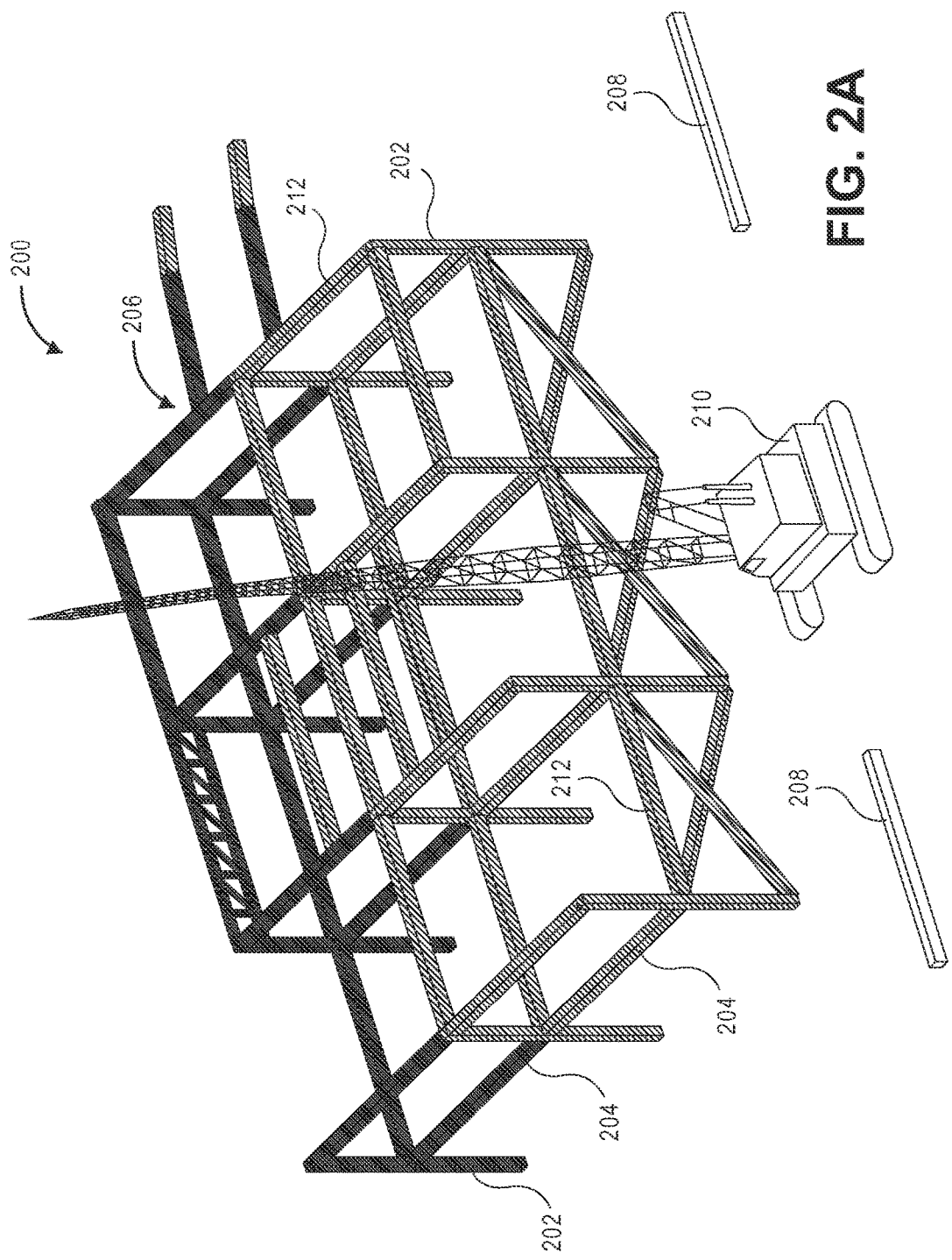
FIGS. 2A and 2B are a diagrammatic graphical representations of example display outputs in accordance with example implementations of the present disclosure.
Figure 2B:
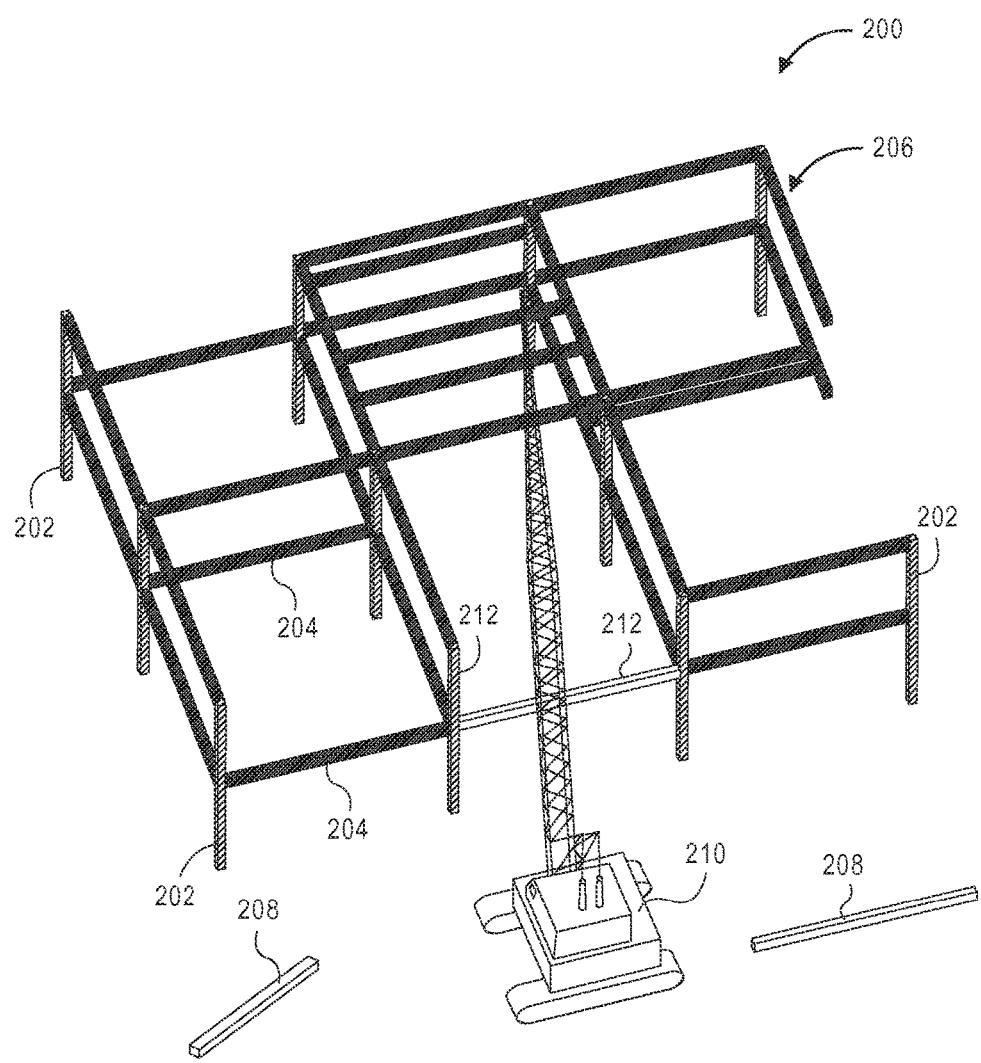

The module 116 is configured to cause the processor 104 to receive an indication that one or more user-provided parameters have been furnished. As described above, the parameters include position parameters relating to a crane (e.g., positions of steel members, position of the crane, position of the prospective structure, etc.) and crane parameters defining the crane to be utilized at the physical work site. For example, the user may provide coordinates (X and Y coordinates) that define the position of each respective member, the crane, the columns and beams of the structure, and so forth. The coordinates correspond to positions within a graphic visualization representing a physical work site environment. As shown in FIGS. 2A and 2B, in an implementation, the graphic visualization 200 includes graphics representing columns 202 and beams 204 to form an at least partially erected structure 206, graphics representing members at an initial position 208 (e.g., a first position), and graphics representing a crane 210. As described above, the work site graphic visualization 200 corresponds to a physical work site. Thus, each steel member graphic corresponds to a physical steel member (a physical column, a physical beam, a physical truss, etc.) to be utilized at the physical work site, the crane graphic represents a physical crane to be utilized at the physical work site, and the at least partially erected structure graphics represent an at least partially erected physical structure at the physical work site. In an implementation, the graphic visualization may be scaled to at least substantially represent the dimensions at the physical work site (e.g., one (1) inch graphically corresponds to one (1) foot at the physical work site, and so forth). The dimensions are meant for example purposes only; therefore, other scales may be utilized.

Upon receiving the indication of the user-defined parameters, the module 116 is configured to cause the processor 104 to determine the liftability of one or more members (e.g., steel members) via the crane as a function of the position parameters and the crane parameters. For example, the processor 104 may cross-reference the position parameters and the crane parameters with the lift data 118. In this example, the module 116 is configured to cause the processor 104 to utilize lift data equations (with the user-supplied parameters) corresponding to the selected crane to determine the liftability of one or more steel members. For instance, the module 116 causes the processor 104 to utilize the lift data 118 to calculate values based upon at least the parameters provided (crane parameters, position parameters) to determine whether the values fall within the acceptable ranges as set forth by the lift data 118. The module 116 may additionally take into account structure parameters (characteristics), member parameters, and so forth, to determine whether the members are accessible. A member may be accessible when, from the user-designated crane position, the crane can lift the member from an initial position and transition the member to a destination position within the constraints dictated in the lift data 118. Otherwise the processor 104 may determine the member is inaccessible (e.g., crane cannot transport member without elevated risks of crane malfunction and/or of injuries occurring).

Once the processor 104 has determined the liftability of at least substantially all the members (e.g., members as defined by the user, members pre-defined in a file, etc.), the module 116 is configured to cause the processor 104 to initiate display of the work site graphic visualization described above (e.g., scaled to correspond to the physical work site). In an implementation, the work site graphic visualization 200 may be displayed in an orthographic (three-dimensional) environment. For example, the data representing the graphic visualization may be stored in a repository, such as memory 106 or a database, in a three-dimensional visualization format. For instance, the visualization may include three-dimensional graphical representations of the crane 210, three-dimensional graphical representations of an at least partially erected structure 206, and/or three-dimensional graphical representations of the members 202, 204. Each graphic may be displayed corresponding (and scaled) to the positions defined by the position parameters (e.g., crane graphic is positioned within the visualization with respect to defined position of the steel member graphics and the at least partially erected structure, etc.). The module 116 may cause the processor 104 to initiate display of the accessible members in a first hue (color) and to initiate display of the inaccessible members in a second hue. For example, the accessible (corresponding member can be lifted by crane) member graphics may be displayed in a green color, and the inaccessible (corresponding member cannot be lifted by crane) member graphics may be displayed in a red color. Additionally, the module 116 is configured to cause critical lift member graphics to be displayed in a third hue, such as orange. However, other colors are contemplated. It is further contemplated that in some implementations the graphic visualization may not be represented to scale.

The user may utilize the computing device 102 to optimize utilization of one or more cranes at the physical work site. For example, the user may provide input to the computing device 102 to instruct the module 116 to cause the processor 104 to determine the accessibility of steel members with two cranes. For instance, the computing device 102 may receive positional parameters for a second crane. In response, the module 116 is configured to cause the processor 104 to generate and cause display of a graphical representation of the liftability of one or more members based upon the second crane's position parameters. In another example, the user may provide position parameters to cause the potential location of the crane to differ to determine the accessibility/inaccessibility of the members to be moved. Thus, the user may utilize the module 116 to determine the economic feasibility of other potential crane positions and/or the utilization of multiple cranes.

Figure 3:
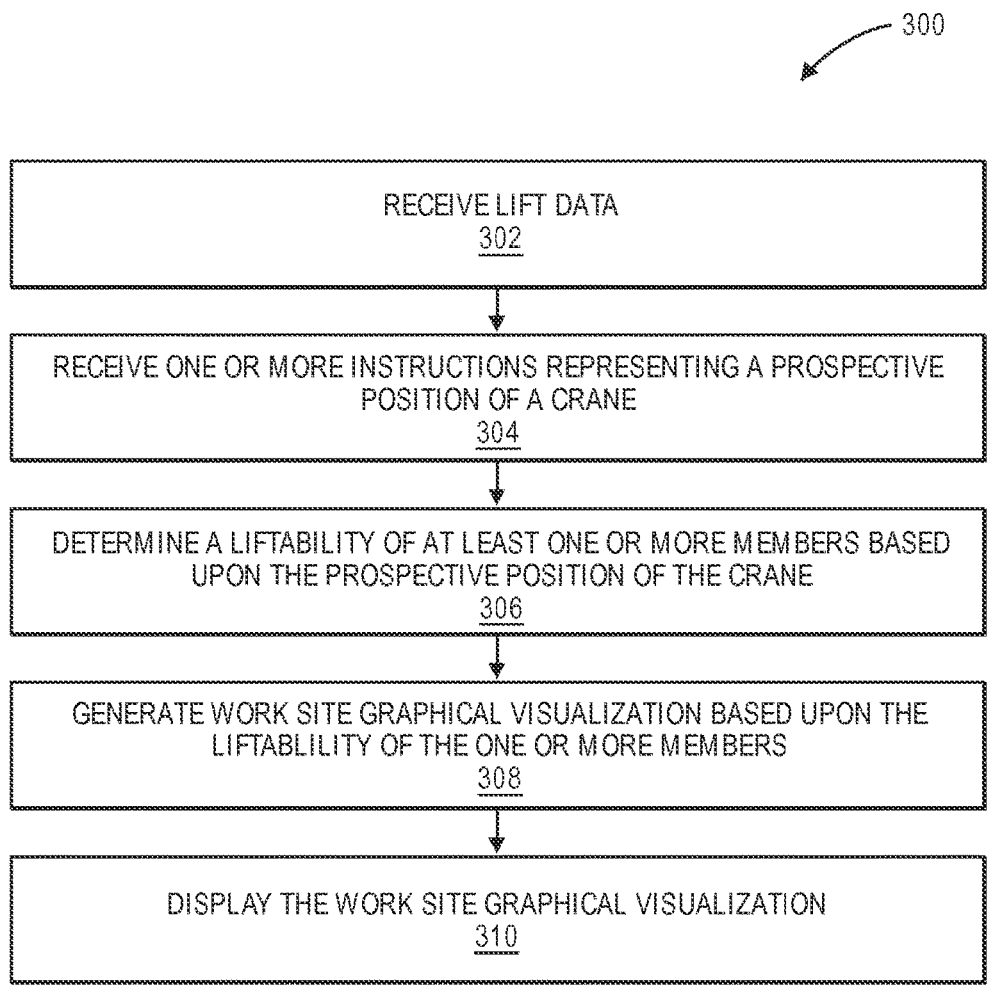
FIG. 3 is a flow diagram illustrating an example method for furnishing one or more graphical visualizations of accessible and inaccessible (e.g., liftability of) members based upon a prospective positioning of a crane.

FIG. 3 illustrates an example method 300 for optimizing crane placement. As shown in FIG. 3, lift data is received (Block 302). As described above, lift data 118 is received by the computing device 102. The lift data 118 represents one or more lift equations, lift tables, or the like, that may be utilized to determine whether a prospective crane can lift a member 202, 204 from a first position 208 (e.g., an original position of a member) and deliver the member to a second position 212 (e.g., destination) based upon the supplied position parameters and supplied crane parameters. One or more instructions are received that represent a prospective position of a crane (Block 304). For example, a user may input instructions representing a position of a crane for determining whether the crane can lift one or more members from a first position to deliver the members to a second position.

Based upon the prospective crane position (e.g., a user-designated crane position), a determination is made of a liftability of at least one or more members (Block 306). In an implementation, the module 116 is configured to cause the processor 104 to determine whether the crane can lift at least one member from a first position to a second position based upon the prospective positioning of the crane. In another implementation, the module 116 is configured to cause the processor 104 to determine how many members the crane can lift and move based upon the prospective position of the crane. For instance, the user may have input a position, or positions, of one or more steel members to be lifted and moved. The module 116 is configured to cause the processor 104 to determine how many steel members can be moved based upon the prospective positioning of the crane.

As shown in FIG. 3, a work site graphical visualization (e.g., representation) is generated based upon the liftability of the one or more members (Block 308). Once the liftability of the one or more members (e.g., building members) is determined, the module 116 is configured to cause the processor 104 to generate and to initiate display of a work site graphical visualization that represents the physical work site. In an implementation, the work site graphical visualization may include three-dimensional graphical representations of the crane, three-dimensional graphical representations of an at least partially erected structure, and/or three-dimensional graphical representations of the members. In another implementation, the work site graphical visualization may include two-dimensional graphical representations of the crane, two-dimensional graphical representations of an at least partially erected structure, and/or two-dimensional graphical representations of the members. As shown in FIG. 3, the work site graphic visualization is displayed at a display device (Block 310). The module 116 is also configured to cause the processor 104 to initiate display of the accessible members (i.e., members that can be lifted by the crane based upon the prospective position of the crane) in a first hue (color) and to initiate display of the inaccessible members in a second hue. For example, the accessible (corresponding member can be lifted by crane) member graphics may be displayed in a green color, and the inaccessible (corresponding member cannot be lifted by crane) member graphics may be displayed in a red color. As described above, a user may utilize the computing device 102 to optimize utilization of one or more cranes at a physical work site. For example, the user may utilize the computing device 102 to input various prospective placements for one or more cranes to determine a number of cranes that may be utilized within the work site environment (i.e., determine a number of cranes based upon a cost-benefit analysis to be utilized within a work site environment).

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A method for the transport of construction members within a physical work site, wherein the method comprises:
   receiving a position parameter representing a position of a crane within the physical worksite;
   receiving first element data regarding the physical characteristics of a first construction member within the physical worksite; wherein the physical characteristics comprise the weight and dimensions of the first construction member;
   receiving second element data regarding the physical characteristics of a second construction member within the physical worksite; wherein the physical characteristics comprise the weight and dimensions of the second construction member;
   receiving first position data, wherein the first position data comprises coordinates representing the present physical position of the first construction member within the physical worksite;
   receiving second position data, wherein the second position data comprises coordinates representing the present physical position of the second construction member within the physical worksite;
   receiving movement data, wherein the movement data comprises location data representing a desired destination location within the physical worksite;
   receiving crane parameters, wherein the crane parameters comprise a boom length for the crane and a lifting capacity limit for the crane;
   determining whether the first construction member is transportable by the crane between the present physical position of the first construction member and the desired destination location; wherein the determination is made using first element data, first position data, the crane parameters, and the movement data; further wherein the determination is made prior to any physical lifting of the first construction member by the crane;
   determining whether the second construction member is transportable by the crane between the present physical position of the second construction member and the desired destination location; wherein the determination is made using second element data, second position data, the crane parameters, and the movement data; further wherein the determination is made prior to any physical lifting of the second construction member by the crane;
   transforming the first and second element data, the first and second position data, the crane parameters, and the movement data into a graphic visualization, wherein the graphic visualization comprises graphical representations of the first construction member and the second construction member, and the physical work site; wherein the graphic visualization comprises a scaled representation of the physical worksite and a scaled representation of the crane, the first construction member and the second construction member within the physical worksite;
   wherein the graphical representation of the first construction member is displayed in a first hue when it is determined that the first construction member may be transported to the desired location and displayed in a second hue when it is determined that the first construction member may not be transported to the desired location;
   further wherein the graphical representation of the second construction member is displayed in a first hue when it is determined that the second construction member may be transported to the desired location and displayed in a second hue when it is determined that the second construction member may not be transported to the desired location;
   wherein the representations of the first construction member in the first hue and the second construction member in the second hue are simultaneously displayed;
   further wherein the representations of the first construction member in the first hue and the second construction member in the second hue are simultaneously displayed prior to either the first construction member or the second construction member being lifted by the crane.

* * * * *